3,265,646
RESINOUS COMPOSITIONS COMPRISING AN EPOXIDIZED ESTER OF A NEOPENTYL POLYHYDRIC ALCOHOL AND METHOD OF PRODUCING SAME
William M. Kraft, Verona, and Joseph Weisfeld, Orange, N.J., assignors, by mesne assignments, to Tenneco Chemicals, Inc., a corporation of Delaware
No Drawing. Filed July 18, 1961, Ser. No. 124,798
10 Claims. (Cl. 260—18)

This invention relates to novel resinous compositions. More particularly the invention relates to compositions comprising an epoxidized ester of a neopentyl polyhydric alcohol, a polyglycidyl ether, and 3,4-dimethyl-6-isobutenyltetrahydrophthalic anhydride and to a method for the production of such compositions. It further relates to the hard resinous products prepared from these compositions.

In copending patent application Serial No. 766,189, which was filed by William M. Kraft and Henri Sidi on October 8, 1958, now abandoned, it was disclosed that certain polyglycidyl ethers can be reacted with 3,4-dimethyl-6-isobutenyltetrahydrophthalic anhydride to form resinous products that are of use in various electrical, pattern, tool, and die-works applications. These resinous compositions tend to be brittle, however, and cannot ordinarily be employed in those applications, such as metal coatings, floor finishes, maintenance paints, and the like where durable, flexible finishes are required.

It has now been discovered that compositions of value in a wide variety of applications can be obtained by modifying the aforementioned polyglycidyl ether-3,4-dimethyl-6-isobutenyltetrahydrophthalic anhydride compositions with an epoxidized ester of a neopentyl polyhydric alcohol. The resulting compositions are suitable for use in casting, laminating, encapsulating, and similar applications. They are of particular value, however, in the production of surface coating compositions. Such compositions can be cured rapidly to form coatings that are characterized by excellent adhesion, hardness, flexibility, and chemical resistance. Unlike previously known epoxy resin systems, the novel compositions are non-viscous liquids which can be applied to a surface, for example, by brushing or spraying as solvent-free compositions or as solutions in mineral spirits and other low cost solvents. These compositions are stable for prolonged periods at room temperature, and they may be readily converted to hard thermoset resins by heating them in the presence of a tertiary amine catalyst.

The epoxidized esters that may be used in the preparation of the novel resinous compositions are those derived from monocarboxylic acid esters of neopentyl polyhydric alcohols containing from 3 to 8 hydroxyl groups per molecule, for example, pentaerythritol, dipentaerythritol, tripentaerythritol, trimethylolethane, trimethylolpropane, and trimethylolbutane. The useful epoxidized esters are those in which at least one of the hydroxyl groups of the neopentyl polyhydric alcohol has been replaced by an aliphatic monocarboxylic acid radical that contains from 4 to 22 carbons and from 1 to 3 oxirane groups and any remaining hydroxyl groups have been replaced by radicals of saturated or unsaturated aliphatic monocarboxylic acids or benzenoid monocarboxylic acids or by mixtures of these radicals.

These epoxidized esters may be formed by converting to epoxy (oxirane) groups at least 70% of the ethylenic groups of an unsaturated ester of the neopentyl polyhydric alcohol. The unsaturated esters may be prepared by esterifying the neopentyl polyhydric alcohol with an amount of monocarboxylic acid that will react with substantially all of the hydroxyl groups of the polyhydric alcohol. If desired, a small excess of either the acid or the polyhydric alcohol may be used. The acids that may be reacted with the polyhydric alcohol to form the esters include the unsaturated straight-chain and branched-chain aliphatic monocarboxylic acids that contain from 4 to 22 carbon atoms and from one to three ethylenic groups. Illustrative of these acids are methacrylic acid, crotonic acid, allylacetic acid, angelic acid, tiglic acid, oleic acid, linoleic acid, linolenic acid, sorbic acid, erucic acid, and brassidic acid. Mixtures of two or more of these unsaturated monocarboxylic acids as well as mixtures of at least one of these acids with saturated aliphatic monocarboxylic acids containing 4 to 22 carbon atoms or benzenoid monocarboxylic acids may also be used. Among the acids that may be used in admixture with the unsaturated acids are butyric acid, caproic acid, 2-ethylhexanoic acid, caprylic acid, stearic acid, benzoic acid, chlorobenzoic acids, anisic acid, toluic acid, nitrobenzoic acids, and hydroxybenzoic acids. Such mixtures of saturated and unsaturated acids contain an amount of the unsaturated acids that will react with at least one of the hydroxyl groups of the polyhydric alcohol. The preferred monocarboxylic acids are drying oil fatty acids and semi-drying oil fatty acids, such as soybean oil fatty acids, linseed oil fatty acids, dehydrated castor oil fatty acids, and tall oil fatty acids. Mixtures of drying oil fatty acids and semi-drying oil fatty acids may also be used.

Any of the well-known epoxidation procedures may be employed to convert the unsaturated esters to the corresponding epoxidized esters. For example, the unsaturated esters may be reacted with hydrogen peroxide or with an organic per acid, such as performic acid, peracetic acid, perbutyric acid, perbenzoic acid, or perphthalic acid, at a temperature between approximately 10° C. and 80° C. until at least 70% of the ethylenic groups in the ester have been converted to epoxy (oxirane) groups. Alternatively the unsaturated acid may be epoxidized prior to its esterification with the neopentyl polyhydric alcohol.

The epoxidized esters that are used in the practice of the present invention ordinarily have oxirane contents in the range of approximately 4.0% to 8.0%. The preferred esters are epoxidized pentaerythritol tetraesters of drying oil fatty acids, semi-drying oil fatty acids, or mixtures of these fatty acids that have oxirane contents in the range of 4.7% to 7.5%. Particularly preferred are epoxidized tall oil fatty acids tetraesters of pentaerythritol that have oxirane contents in the range of 5.2% to 7.3%. In each case the maximum oxirane content possible, that is, the oxirane content of the ester in which all of the ethylenic groups have been converted to epoxy groups, is dependent upon the molecular weight of the ester and the degree of unsaturation of the acids used in its preparation. The preparation and properties of these epoxidized esters are described in copending patent application Serial No. 784,057, which was filed by William M. Kraft and James P. Scullin on December 3, 1958, now abandoned.

The polyglycidyl ethers that may be present in the novel compositions are low molecular weight compounds that are liquids or low melting solids at room temperature and that are compatible with the aforementoned epoxidized esters. These polyglycidyl ethers, which are the products of the condensation of a halohydrin with a polyhydric alcohol or a polyhydric phenol, contain an average of 1.0 to 3.0 and preferably an average of 1.2 to 2.0 oxirane groups per molecule. A preferred group of polyglycidyl ethers are the condensation products of epichlorohydrin and 2,2-bis(4-hydroxyphenyl) propane that have epoxide equivalent weights below approximately 400, the epoxide equivalent weight being the average weight of the polyglycidyl ether that will contain one oxirane group. Typical of these polyglycidyl ethers are Epon 828, a liquid ether having an epoxide equivalent weight of 185 to 205, and Epon 836, low melting ether having an epoxide equivalent weight of 280 to 350. A second preferred group of polyglycidyl ethers are those derived from terpene-phenol condensation products. These polyglycidyl ethers, which are preferably derived from a p-menthadiene or a terpene that may be converted to a p-menthadiene during the course of the reaction, for example, dipentene, limonene, or $\alpha$-pinene, preferably have hydroxyl contents of approximately 2.5% to 4.8%, oxirane contents of approximately 1.5% to 2.7%, and combined hydroxyl contents and oxirane contents of approximately 4.5% to 7.0%. Their epoxide equivalent weights are generally in the range of 300 to 900. The preparation and properties of these polyglycidyl ethers are described in copending patent application Serial No. 107,309, which was filed by William M. Kraft and Roy T. Gottesman on May 3, 1961.

The third component of the novel resinous compositions is usually and preferably 3,4-dimethyl-6-isobutenyl-tetrahydrophthalic anhydride. This compound which is liquid at room temperature may be readily prepared by the reaction of approximately equimolecular quantities of allo-ocimene and maleic anhydride at a temperature between 80° and 110° C. Either the crude product of this reaction, which contains approximately 65% to 90% of 3,4-dimethyl-6-isobutenyltetrahydrophthalic anhydride, or the purified compound may be used in the novel resinous compositions. Also useful as a component of the resinous compositions is 3,4-dimethyl-6-isobutylhexahydrophthalic anhydride, which may be obtained by hydrogenating 3,4-dimethyl-6-isobutenyltetrahydrophthalic anhydride in the presence of a hydrogenation catalyst, such as Raney nickel. Mixtures of 3,4-dimethyl-6-isobutenyltetrahydrophthalic anhydride and 3,4-dimethyl-6-isobutylhexahydrophthalic anhydride may also be used.

The properties of the products of the present invention depend to a large extent upon the relative amounts of the three components used in their preparation. Compositions suitable for use in a variety of casting and surface-coating applications may contain from approximately 0.5 to 1.5 equivalent of the anhydride per epoxide equivalent of the epoxidized ester and the polyglycidyl ether. Products having the best combination of properties, that is, maximum resistance to water, to solvents, and to alkalies and excellent flexibility, impact strength, adhesion, and hardness, are those in which the amount of anhydride used is substantially that required to react with all of the oxirane groups of the epoxidized ester and the polyglycidyl ether, that is, in which approximately 1.0 equivalent of the anhydride is used per epoxide equivalent of the epoxidized ester and the polyglycidyl ether.

The properties of the cured resinous products are also dependent upon the relative amounts of the epoxidized ester and the polyglycidyl ether that are employed. For example, relatively soft, flexible products are obtained when 4 or more parts by weight of the ester are used per part by weight of the polyglycidyl ether, whereas rather hard and brittle products result when less than 1 part by weight of the ester is used per part by weight of the polyglycidyl ether. Compositions containing approximately 0.1 to 10 parts by weight of the epoxidized ester per part by weight of the polyglycidyl ether have proven useful in casting, laminating, encapsulating, and similar applications. Compositions that contain from 1 to 4 parts and preferably from 1.5 to 3 parts by weight of the epoxidized ester per part by weight of the polyglycidyl ether have been found to be particularly valuable as surface coating materials. Such compositions can be used in the preparation of products that are characterized by excellent adhesion, flexibility, hardness, and resistance to water, to alkalies, and to solvents.

The amount of each of the three components present in the novel compositions depends upon such factors as the specific compounds chosen and their equivalent weights and the particular combination of properties that is desired in the finished product. In most cases the compositions contain approximately 20% to 40% by weight of the epoxidized ester, 5% to 30% of the polyglycidyl ether, and 40% to 60% of the anhydride. Preferred as surface-coating materials are those compositions that contain approximately 30% to 35% by weight of the epoxidized ester, 10% to 20% of the polyglycidyl ether, and 50% to 55% of 3,4-dimethyl-6-isobutenyltetrahydrophthalic anhydride and/or its hydrogenated derivative.

The resinous compositions of the present invention may be prepared by simply stirring the components together when all of the components are liquid at room temperature. When one or more of the components are solids or viscous liquids, heat may be applied to facilitate the mixing. Alternatively, the epoxidized ester may be mixed with the polyglycidyl ether to form a homogeneous solution that contains approximately 50% to 90% and preferably 60% to 75% of the ester and 10% to 50% and preferably 25% to 40% of the polyglycidyl ether. The anhydride is then added to the mixture of the epoxidized compounds. When the composition is to be used as a solvent-containing system, the solvent, for example, xylene or mineral spirits, is generally added along with the other components, or one of the components is dissolved in the solvent prior to the mixing step.

The three-component resinous compositions of the present invention are stable at ordinary temperatures for prolonged periods. For example, they may be stored at room temperature for 4 months or longer without undergoing appreciable increase in viscosity or other indication of spontaneous curing. To achieve maximum stability, the compositions should be stored under moisture-free conditions and preferably in an inert atmosphere. The hydroxyl contents of the polyglycidyl ether and the epoxidized ester also have an effect on the shelf-life of the composition, with more stable products resulting from the use of materials having low hydroxyl contents. In addition the anhydride used should contain little or no free acid, since even small amounts of acid have an adverse effect on the stability of the composition.

The resinous compositions may be cured by adding to them from 1% to 10% and preferably approximately 5% by weight (based on the combined weight of the epoxidized ester and the polyglycidyl ether) of a tertiary amine catalyst and heating the resulting mixture at a temperature between 80° C. and 200° C. and preferably between 120° C. and 180° C. until a hard resin is obtained. Surface-coating compositions having an excellent combination of properties may be obtained by forming films approximately 1 to 10 mils in thickness and heating the films at approximately 150° C. for periods ranging from 10 minutes to one hour. Castings and laminated products are generally cured for longer periods of time with the curing time in each case largely dependent upon the thickness of the product.

Any of the tertiary amines that are commonly employed as catalysts in the curing of epoxy resins may be used in this step. These include, for example, dimethylaminomethylphenol, tris(dimethylaminomethyl) phenol, N,N-dimethylbenzylamine, tributylamine, pyridine, and the like.

At any stage prior to the curing step, the resinous compositions or any of their components may be mixed with fillers, pigments, dyes, plasticizers, and the like in the amounts ordinarily employed for the purposes specified.

The pigmented compositions have a combination of properties, including excellent adhesion, flexibility, hardness, and resistance to water, solvents, and alkalies, that makes them valuable as primer paints. They may be used with acrylic enamels or other topcoats to form systems that have excellent chemical resistance, gloss, and mechanical properties.

This invention is further illustrated by the examples that follow. It is to be understood, however, that these examples are given solely for the purpose of illustration and that the invention is not to be regarded as limited to any of the specific materials or conditions recited therein except as set forth in the appended claims.

*Example 1*

Resinous compositions were prepared by mixing together an epoxidized tall oil fatty acids tetraester of pentaerythritol, which had an oxirane content of 5.46%, a condensation product of epichlorohydrin and 2,2-bis(4-hydroxyphenyl) propane that has an epoxide equivalent weight of 185 to 205 and that is marketed as Epon 828, and 3,4 - dimethyl - 6 - isobutenyltetrahydrophthalic anhydride in the amounts set forth in Table I. The stability of these compositions was determined by measuring their viscosity just after their preparation and after they had been allowed to stand for prolonged periods at room temperature. The viscosity data obtained are given in Table I.

TABLE I

| Composition | A | B |
|---|---|---|
| Epoxidized Ester (grams) | 25 | 30 |
| Epon 828 (grams) | 15 | 10 |
| Anhydride (grams) | 42 | 38.2 |
| Viscosity (Gardner-Holdt) at 25° C.: | | |
| Initial | U+ | U- |
| After 1 month | X-Y | X |
| After 2 months | Z-1 | Y |
| After 3 months | Z-1 | Z- |
| After 4 months | Z-3 | Z- |

*Example 2*

A resinous composition was prepared by adding 49.9 grams of 3,4 - dimethyl - 6 - isobutenyltetrahydrophthalic anhydride to a mixture of 38.3 grams of an epoxidized tall oil fatty acids tetraester of pentaerythritol which had an oxirane content of 5.47% and 12.8 grams of a condensation product of epichlorohydrin and 2,2-bis(4-hydroxyphenyl) propane that has an epoxide equivalent weight of 185 to 205 and that is marketed as Epon 828. After the addition of 2.5 grams of tris(dimethylaminomethyl) phenol, films of the composition (wet thickness, 1.5 mils) were cured at 150° C. for 30 minutes to form clear, hard resinous coatings.

*Example 3*

A resinous composition was prepared by adding 50.3 grams of 3,4 - dimethyl - 6 - isobutenyltetrahydrophthalic anhydride to a mixture of 31 grams of an epoxidized tall oil fatty acids tetraester of pentaerythritol which had an oxirane content of 5.47% and 18.6 grams of a condensation product of epichlorohydrin and 2,2-bis(4-hydroxyphenyl) propane that has an epoxide equivalent weight of 185 to 205 and that is marketed as Epon 828. After the addition of 2.5 grams of tris(dimethylaminomethyl) phenol, films of the composition (wet thickness, 1.5 mils) were cured at 150° C. for 30 minutes to form clear, hard resinous coatings.

*Example 4*

The products of Examples 2 and 3 were evaluated by standard test methods. The results obtained are given in Table II.

TABLE II

| Composition | Product of Example 2 | Product of Example 3 |
|---|---|---|
| Sward Hardness: | | |
| 1 Day | 40 | 48. |
| 14 Days | 68 | 60. |
| 28 Days | 70 | 62. |
| Flexibility (⅛″ mandrel) | Pass | Pass. |
| Reverse Impact (pounds) | Pass 160 | Pass 160. |
| Resistance to boiling water (Effect in 1½ hrs.) | No effect | No effect. |
| Resistance to 20% NaOH (Days to Denude) | 5 | 4. |
| Resistance to MIBK (Days to Denude) | 19 | 14. |
| Resistance to Gasoline (Days to Denude) | 29 | >31. |
| Resistance to 20% Salt Spray (230 hrs.) | Fair | Excellent. |
| Adhesion (Cross hatch test) | OK—No peel | OK—No peel. |

From the data in Table II it will be observed that the products of the present invention have excellent flexibility, impact strength, adhesion, and resistance to salt spray, water, solvents, and alkalies.

*Example 5*

A resinous composition was prepared by mixing together at room temperature 19.1 grams of an epoxidized tall oil fatty acids tetraester of pentaerythritol that had an oxirane content of 5.46%, 6.4 grams of a condensation product of epichlorohydrin and 2,2-bis(4-hydroxyphenyl) propane that has an epoxide equivalent weight of 185 to 205 and that is marketed as Epon 828, and 24.5 grams of 3,4 - dimethyl-6-isobutenyltetrahydrophthalic anhydride. To this composition was added 30 grams of titanium dioxide, 24.5 grams of talc, 0.5 gram of carbon black, and 21 ml. of mineral spirits. The resulting pigmented mixture was ground overnight in a pebble mill to a 4–5 Hegeman grind.

*Example 6*

A resinous composition was prepared by mixing together at room temperature 15.5 grams of an epoxidized tall oil fatty acids tetraester of pentaerythritol that had an oxirane content of 5.46%, 9.3 grams of a condensation product of epichlorohydrin and 2,2-bis(4-hydroxyphenyl) propane that has an epoxide equivalent weight of 185 to 205 and that is marketed as Epon 828, and 25.2 grams of 3,4 - dimethyl-6-isobutenyltetrahydrophthalic anhydride. To this mixture was added 30 grams of titanium dioxide, 24.5 grams of talc, 0.5 gram of carbon black, and 17 ml. of mineral spirits. The resulting pigmented mixture was ground overnight in a pebble mill to a 4–5 Hegeman grind.

*Example 7*

To each of the products of Examples 5 and 6 was added 0.59 gram of tris(dimethylaminomethyl)phenol. Films of the resulting mixtures (1.5 mils wet film thickness) were cured at 150° C. for 30 minutes and then evaluated. The properties of these films are given in Table III.

TABLE III

| Composition | Product of Example 5 | Product of Example 6 |
|---|---|---|
| Sward Hardness | 24 | 30. |
| Flexibility (⅛″ mandrel) | Pass | Pass. |
| Reverse impact (in pounds) | Pass 80 | Pass 100. |
| Resistance to boiling water (Effect in 1½ hrs.) | No effect | No effect. |
| Resistance to 20% NaOH (Days to Denude) | 7 | 31. |
| Resistance to Methyl Isobutyl Ketone (Days to Denude) | 2 | 7. |
| Resistance to Gasoline (Days to Denude) | 20 | 20. |
| Adhesion | Excellent | Excellent. |

A white acrylic baking enamel was applied over each of the pigmented coatings described in Table III. After baking, both of the primer-enamel systems had excellent gloss, mechanical strength, and resistance to chemicals.

Example 8

A series of compositions was prepared by mixing an epoxidized tall oil fatty acids ester of pentaerythritol, dipentaerythritol or tripentaerythritol with a polyglycidyl ether of 2,2-bis(4-hydroxyphenyl) propane (Epon 828) and 3,4 - dimethyl - 6 - isobutenyltetrahydrophthalic anhydride. To this mixture was added 5% based on the combined weight of the ester and the ether of tris(dimethylaminomethyl) phenol. Films of the mixtures (1.5 mil film thickness) were cured at 150° C. for one hour, and castings were made by pouring the compositions into 0.5″ x 0.5″ x 6″ molds and curing them at 150° C. for 16 hours. The components of the compositions and the properties of the cured products are given in Table IV.

TABLE V

| Composition | A | B | C |
|---|---|---|---|
| INGREDIENTS (GRAMS) | | | |
| Epoxidized Ester | 15 | 15 | 15. |
| Polyglycidyl ether | 5 | 5 | 5. |
| Anhydride | 11.5 | 13.0 | 14.5. |
| Equivalents of anhydride per epoxide equivalent of ester and ether. | 0.8 | 0.9 | 1.0. |
| PROPERTIES OF CURED FILM | | | |
| Sward Hardness | 20 | 30 | 38. |
| Flexibility (⅛″ mandrel) | Pass | Pass | Pass. |
| Resistance to boiling water (effect in 1½ hours). | Slight effect. | Slight effect. | Slight effect. |
| Resistance to 20% NaOH (Days to Denude). | 4 | 6 | 6. |

Example 10

A series of compositions, each of which contained an epoxidized ester, a condensation product of epichlorohydrin and 2,2-bis(4-hydroxyphenyl) propane that has an

TABLE IV

| Composition | A | B | C |
|---|---|---|---|
| INGREDIENTS (GRAMS) | | | |
| Epoxidized tall oil tetraester of pentaerythritol (oxirane content, 5.56%). | 25 | | |
| Epoxidized tall oil hexaester of dipentaerythritol (oxirane content, 5.31%). | | 25 | |
| Epoxidized tall oil octaester of tripentaerythritol (oxirane content, 5.13%). | | | 25. |
| Epon 828 | 15 | 15 | 15. |
| 3,4-dimethyl-6-isobutenyltetrahydrophthalic anhydride. | 41 | 42.5 | 41. |
| Equivalents of anhydride per epoxide equivalent of epoxidized ester + Epon 828. | 1.03 | 1.06 | 1.03. |
| PROPERTIES OF CURED FILMS | | | |
| Sward Hardness: | | | |
| 1 Day | 54 | 56 | 44. |
| 14 Days | 64 | 60 | 44. |
| 28 Days | 72 | 60 | 42. |
| Flexibility (⅛″ mandrel): | | | |
| 1 Day | Pass | Pass | Pass. |
| 14 Days | do | do | Fail. |
| Reverse Impact (in pounds): | | | |
| 1 Day | Pass 160 | Pass 160 | Pass 110. |
| 14 Days | do | Pass 135 | Do. |
| Resistance to 20% NaOH (Days to Denude) | 4 | 5 | 4. |
| Resistance to 20% HCl (Days to Denude) | <40 | <40 | <40. |
| Resistance to Gasoline (Days to Denude) | <40 | <40 | <40. |
| Resistance to Boiling Water (Effect in 1½ Hours). | No effect | Very slight effect. | No effect. |
| Resistance to Salt Spray (200 Hours) | Good | Fair | Fair. |
| Adhesion (Cross Hatch Test) | Excellent | Good | Poor. |
| Properties of Cured Castings: Heat distortion temperature (° C.). | 71 | 68 | 80. |

Example 9

A mixture was prepared by adding 5 grams (0.0069 equivalent) of a terpene-phenol polyglycidyl ether to 15 grams (0.051 equivalent) of an epoxidized tall oil fatty acids tetraester of pentaerythritol which had an oxirane content of 5.49%. The polyglycidyl ether used in the preparation of the mixture was derived from a dipentene-phenol condensation product and had a hydroxyl content of 3.85% and an oxirane content of 2.2%. To this mixture was added 11.5 grams (0.046 equivalent) of 3,4-dimethyl - 6 - isobutenyltetrahydrophthalic anhydride. After the addition of 1.0 gram of tris(dimethylaminomethyl) phenol, the mixture was cast into films and cured at 150° C. for 1 hour.

Additional compositions were prepared by adding other amounts of the anhydride to the mixture of the epoxidized pentaerythritol tetraester of tall oil fatty acids and the polyglycidyl ether of the dipentene-phenol condensation product. The composition of the films and their properties are given in Table V.

epoxide equivalent weight of 185 to 205 and that is marketed as Epon 828, and an anhydride or anhydride mixture, was prepared by adding to a mixture containing 3 parts by weight of an epoxidized tall oil fatty acids tetraester of pentaerythritol which had an oxirane content of 5.5% and 1 part by weight of Epon 828 the amount of anhydride or anhydride mixture required to provide one equivalent of anhydride per epoxide equivalent of the ester and Epon 828. Then to those systems in which the anhydride was compatible with the mixture of epoxide compounds was added 2% (based on the weight of the epoxide compounds) of tris(dimethylaminomethyl) phenol. The compositions were cured at 150° C. for 1 hour. The degree of cure was then determined by observing the film integrity and the physical properties of each of the systems. Those systems that had not cured satisfactorily were baked for an additional 2 hours at 150° C., but in no case was an appreciable improvement in film properties noted.

The anhydrides tested and the results obtained are set forth in Table VI.

TABLE VI

| Anhydride or Anhydride Mixture | Physical State of Anhydride | Compatibility with Ester-Epon 828 Mixture | Cure |
|---|---|---|---|
| 3,4-dimethyl-6-isobutenyltetrahydrophthalic anhydride | Liquid | Compatible | Excellent. |
| 3,4-dimethyl-6-isobutylhexahydrophthalic anhydride | do | do | Do. |
| Dodecenyl succinic anhydride | do | do | Fair. |
| Chloromaleic anhydride | do | do | Poor. |
| Methyl Nadic Anhydride (Methylendomethylenetetrahydrophthalic anhydride) | do | do | Do. |
| Hexahydrophthalic Anhydride | Solid (M.P. 35–36° C.) | do | Do. |
| Tetrahydrophthalic anhydride | Solid | Incompatible | |
| Maleic Anhydride | do | do | |
| Phthalic Anhydride | do | do | |
| HET Anhydride (hexachloroendomethylene-tetrahydrophthalic anhydride) | do | do | |
| Dichloromaleic anhydride | do | do | |
| Pyromellitic Dianhydride | do | do | |
| HET Anhydride, 60 parts by wt. Methyl Nadic Anhydride, 100 parts by wt. | Liquid | Compatible | Fair. |
| HET Anhydride, 60 parts by wt. Hexahydrophthalic Anhydride, 100 parts by wt. | do | do | Do. |
| HET Anhydride, 25 parts by wt. Tetrahydrophthalic Anhydride, 100 parts by wt. | Solid | Incompatible | |
| HET Anhydride, 60 parts by wt. Maleic Anhydride, 100 parts by wt. | Liquid | Compatible | Do. |
| Maleic Anhydride, 60 parts by wt. Hexahydrophthalic Anhydride, 100 parts by wt. | do | do | Do. |
| Maleic Anhydride, 1 part by wt. Tetrahydrophthalic anhydride, 1 part by wt. | Solid | Incompatible | |
| Phthalic Anhydride, 37 parts by wt. Tetrahydrophthalic Anhydride, 100 parts by wt. | do | do | |
| Maleic Anhydride, 60 parts by wt. Methyl Nadic Anhydride, 100 parts by wt. | Liquid | Compatible | Poor. |
| Maleic Anhydride, 1 part by wt. Tetrahydrophthalic Anhydride, 1 part by wt. Hexahydrophthalic Anhydride, 1 part by wt. | Solid | Incompatible | |
| Phthalic Anhydride, 1 part by wt. Tetrahydrophthalic Anhydride, 1 part by wt. Hexahydrophthalic anhydride, 1 part by wt. | do | do | |
| 3,4-dimethyl-6-isobutenyltetrahydrophthalic anhydride, 100 parts by wt. Maleic anhydride, 30 parts by wt. | Liquid | Compatible | Do. |
| 3,4-dimethyl-6-isobutenyltetrahydrophthalic anhydride, 100 parts by wt. Tetrahydrophthalic anhydride, 5 parts by wt. | do | do | Do. |
| 3,4-dimethyl-6-isobutenyltetrahydrophthalic anhydride, 100 parts by wt. | | | |
| 3,4-dimethyl-6-isobutylhexahydrophthalic anhydride, 50 parts by wt. | do | do | Excellent. |
| 3,4-dimethyl-6-isobutenyltetrahydrophthalic anhydride, 100 parts by wt. HET anhydride, 60 parts by wt. | do | do | Fair. |
| 3,4-dimethyl-6-isobutenyltetrahydrophthalic anhydride, 100 parts by wt. Methyl Nadic Anhydride, 50 parts by wt. | do | do | Do. |

From the data in Table VI it will be seen that only 3,4 - dimethyl - 6 - isobutenyltetrahydrophthalic anhydride, its hydrogenated derivative, 3,4 - dimethyl-6-isobutylhexahydrophthalic anhydride, and mixtures of these anhydrides provide cured products having an excellent combination of properties. All of the other anhydrides and anhydride mixtures used were either solid materials that were incompatible with the epoxidized esterglycidyl ether mixture or liquid materials that yielded on curing products having poor to fair properties.

*Example 11*

A resinous composition was prepared by adding 51.2 parts by weight of 3,4-dimethyl-6-isobutenyltetrahydrophthalic anhydride to a mixture of 30.5 parts by weight of an epoxidized tall oil fatty acids tetraester of pentaerythritol which had an oxirane content of 5.6% and 18.3 parts by weight of a condensation product of epichlorohydrin and 2,2-bis(4-hydroxyphenyl)propane that has an epoxide equivalent weight of 185 to 205 and that is marketed as Epon 828. The resulting resinous composition, which was stable at room temperature for more than 6 months, had an initial viscosity (Gardner-Holdt) at 25° C. of U+.

After the addition of 2.4 parts by weight of tris(dimethylaminomethyl) phenol, the composition was poured into a 0.5″ x 0.5″ x 6″ mold and cured first at 120° C. for 16 hours and then at 180° C. for 1 hour. The resulting casting had the following properties:

| Property | ASTM Test Method | |
|---|---|---|
| Density at 25° C | | 1.09 g./ml. |
| Heat Distortion Temperature | D-648 | 74° C. |
| Ultimate Flexural Strentth | D-790 | 8,620 p.s.i. |
| Flexural Modulus | D-790 | 2.65×10$^5$ p.s.i. |
| Barcol Hardness | | 7. |
| Ultimate Compressive Strength | D-695 | 10,600 p.s.i. |
| Compressive Modulus | D-695 | 2.5×10$^5$ p.s.i. |
| Izod Impact Strength | D-256 | 0.29 ft. lbs./inch of notch. |
| Volume Resistivity | D-257 | >3.51 ohm cm.×10$^{16}$. |
| Power Factor at 60 Cycles | D-150 | 0.00768. |
| Power Factor at 10$^6$ Cycles | D-150 | 0.0213. |
| Dielectric Constant at 60 Cycles | D-150 | 2.80. |
| Dielectric Constant at 10$^6$ Cycles | D-150 | 2.51. |

What is claimed is:

1. The resinous composition comprising (a) an epoxidized ester of a neopentyl polyhydric alcohol containing from 3 to 8 hydroxyl groups per molecule and monocarboxylic acid wherein each of the hydroxyl groups of said neopentyl polyhydric alcohol has been replaced by the acid radical of said monocarboxylic acid, one of said monocarboxylic acid radicals being an eliphatic monocarboxylic acid radical containing from 4 to 22 carbon atoms and from 1 to 3 oxirane groups and the remainder of said monocarboxylic acid radicals being members selected from the group consisting of aliphatic monocarboxylic acid radicals containing from 4 to 22 carbon atoms and from 1 to 3 oxirane groups, aliphatic monocarboxylic acid radicals containing from 4 to 22 carbon atoms, benzenoid monocarboxylic acid radicals, and mixtures thereof, said epoxidized ester having an oxirane content of approximately 4.0% to 8.0%; (b) a low molecular weight polyglycidyl ether which is the product of the condensation of epichlorohydrin with a polyhydric compound selected from the group consisting of polyhydric alcohols and polyhydric phenols, said ether having an average of 1.0 to 3.0 oxirane groups per molecule; and (c) an anhydride selected from the group consisting of 3,4-dimethyl - 6 - isobutenyltetrahydrophthalic anhydride, 3,4-dimethyl-6-isobutylhexahydrophthalic anhydride, and mixtures thereof, said anhydride being liquid at room temperature, said composition containing approximately 0.1 part to 10 parts by weight of said epoxidized ester per part by weight of said polyglycidyl ether and approximately 0.5 to 1.5 equivalents of said anhydride for each epoxide equivalent of said epoxidized ester and said polyglycidyl ether.

2. The resinous composition comprising (a) an epoxidized tetraester of pentaerythritol and monocarboxylic acids, said monocarboxylic acids being selected from the group consisting of drying oil fatty acids, semi-drying oil fatty acids, and mixtures thereof, said epoxidized ester having an oxirane content of approximately 4.7% to 7.5%; (b) a low molecular weight polyglycidyl ether which is the product of the condensation of epichlorohydrin with 2,2-bis(4-hydroxyphenyl) propane, said ether having an epoxide equivalent weight below approximately 400; and (c) 3,4-dimethyl-6-isobutenyltetrahydrophthalic anhydride, said anhydride being liquid at room temperature, said composition containing approximately 1 part to 4 parts by weight of said epoxidized pentaerythritol ester per part by weight of said polyglycidyl ether and approximately one equivalent of said anhydride per epoxide equivalent of said epoxidized pentaerythritol ester and said polyglycidyl ether.

3. The resinous composition comprising (a) 20% to 40% by weight of an epoxidized tall oil fatty acids tetraester of pentaerythritol, said ester having an oxirane content of 5.2% to 7.3%; (b) 5% to 30% by weight of a low molecular weight polyglycidyl ether which is the product of the condensation of epichlorohydrin with a polyhydric compound selected from the group consisting of polyhydric alcohols and polyhydric phenols, said ether having an average of 1.2 of 2.0 oxirane groups per molecule; and (c) 40% to 60% by weight of 3,4-dimethyl-6-isobutenyltetrahydrophthalic anhydride said anhydride being liquid at room temperature.

4. The cured resin which is the product obtained by heating at a temperature between 80° C. and 200° C. in the presence of a tertiary amine catalyst a resinous composition comprising (a) 20% to 40% by weight of an epoxidized ester of a neopentyl polyhydric alcohol containing from 3 to 8 hydroxyl groups per molecule and monocarboxylic acid wherein each of the hydroxyl groups of said neopentyl polyhydric alcohol has been replaced by the acid radical of said monocarboxylic acid, one of said monocarboxylic acid radicals being an aliphatic monocarboxylic acid radical containing from 4 to 22 carbon atoms and from 1 to 3 oxirane groups and the remainder of said monocarboxylic acid radicals being members selected from the group consisting of aliphatic monocarboxylic acid radicals containing from 4 to 22 carbon atoms and from 1 to 3 oxirane groups, aliphatic monocarboxylic acid radicals containing from 4 to 22 carbon atoms, benzenoid monocarboxylic acid radicals, the mixtures thereof, said epoxidized ester having an oxirane content of approximately 4.0% to 8.0%; (b) 5% to 30% by weight of a low molecular weight polyglycidyl ether which is the product of the condensation of epichlorohydrin with a polyhydric compound selected from the group consisting of polyhydric alcohols and polyhydric phenols, said ether having an average of 1.0 to 3.0 oxirane groups per molecule; and (c) 40% to 60% by weight of an anhydride selected from the group consisting of 3,4-dimethyl-6-isobutenyltetrahydrophthalic anhydride, 3,4-dimethyl-6-butylhexahydrophthalic anhydride, and mixtures thereof, said anhydride being liquid at room temperature.

5. The cured resin which is the product obtained by heating at a temperature between 120° C. and 180° C. in the presence of approximately 1% to 10% by weight of a tertiary amine a resinous composition comprising (a) 30% to 35% by weight of an epoxidized tall oil fatty acids tetraester of pentaerythritol, said ester having an oxirane content of 5.2% to 7.3%; (b) 10% to 20% by weight of a low molecular weight polyglycidyl ether which is the product of the condensation of epichlorohydrin with 2,2-bis(4-hydroxyphenyl)-propane, said ether having an epoxide equivalent weight below approximately 400; and (c) 50% to 55% by weight of 3,4-dimethyl-6-isobutenyltetrahydrophthalic anhydride, said anhydride being liquid at room temperature.

6. The cured resin which is the product obtained by heating at a temperature between 120° C. and 180° C. in the presence of approximately 1% to 10% by weight of a tertiary amine a resinous composition comprising (a) 30% to 35% by weight of an epoxidized tall oil fatty acids tetraester of pentaerythritol, said ester having an oxirane content of 5.2% to 7.3%; (b) 10% to 20% by weight of a low molecular weight polyglycidyl ether of a terpene-phenol condensation product, said ether having a hydroxyl content of approximately 2.5% to 4.8%, an oxirane content of approximately 1.5% to 2.7%, and a combined hydroxyl content and oxirane content of approximately 4.5% to 7.0%; and (c) 50% to 55% by weight of 3,4-dimethyl-6-isobutenyltetrahydrophthalic anhydride, said anhydride being liquid at room temperature.

7. The process of producing resinous products comprising the steps of forming a mixture comprising (a) 20% to 40% by weight of an epoxidized ester of a neopentyl polyhydric alcohol containing from 3 to 8 hydroxyl groups per molecule and monocarboxylic acid wherein each of the hydroxyl groups of said neopentyl polyhydric alcohol has been replaced by the acid radical of said monocarboxylic acid, one of said monocarboxylic acid radicals being an aliphatic monocarboxylic acid radical containing from 4 to 22 carbon atoms and from 1 to 3 oxirane groups and the remainder of said monocarboxylic acid radicals being members selected from the group consisting of aliphatic monocarboxylic acid radicals containing from 4 to 22 carbon atoms and from 1 to 3 oxirane groups, aliphatic monocarboxylic acid radicals containing from 4 to 22 carbon atoms, benzenoid monocarboxylic acid radicals, and mixtures thereof, said ester having an oxirane content of approximately 4.0% to 8.0%; (b) 5% to 30% by weight of a low molecular weight polyglycidyl ether which is the product of the condensation of epichlorohydrin with a polyhydric compound selected from the group consisting of polyhydric alcohols and polyhydric phenols, said ether having an average of 1.0 to 3.0 oxirane groups per molecule; and (c) 40% to 60% by weight of an anhydride selected from the group consisting of 3,4-dimethyl-6-isobutenyl-tetrahydrophthalic anhydride, 3,4-dimethyl-6-butyl-hexahydrophthalic anhydride, and mixtures thereof, said anhydride being liquid at room temperature, and thereafter curing said mixture at a temperature between 80° C. and 200° C. in the presence of a tertiary amine catalyst.

8. The process of producing resinous products comprising the steps of forming a mixture comprising (a) 30% to 35% by weight of an epoxidized tall oil fatty acids tetraester of pentaerythritol, said ester having an oxirane content of 5.2% to 7.3%; (b) 10% to 20% by weight of a low molecular weight polyglycidyl ether which is the product of the condensation of epichlorohydrin with 2,2-bis(4-hydroxyphenyl) propane, said ether having an epoxide equivalent weight below approximately 400; and (c) 50% to 55% by weight of 3,4-dimethyl-6-isobutenyltetrahydrophthalic anhydride said anhydride being liquid at room temperature, and thereafter curing said mixture at a temperature of 120° C. to 180° C. in the presence of a tertiary amine catalyst.

9. The process of producing resinous products comprising the steps of forming an epoxide mixture containing 50% to 90% by weight of an epoxidized tetraester of pentaerythritol and monocarboxylic acids, said monocarboxylic acids being selected from the group consisting of drying oil fatty acids, semi-drying oil fatty acids, and mixtures thereof, said epoxidized ester having an oxirane content of approximately 4.7% to 7.5%, and 10% to 50% by weight of a low molecular weight polyglycidyl ether which is the product of the condensation of epichlorohydrin with a polyhydric compound selected from the group consisting of polyhydric alcohols and polyhydric phenols, said ether having an average of 1.0 to 3.0 oxirane groups per molecule; adding to said epoxide mixture an anhydride selected from the group consisting of 3,4-dimethyl-6-isobutenyltetrahydrophthalic anhydride, 3,4-dimethyl-6-butylhexahydrophthalic anhydride, and mixtures thereof, said anhydride being liquid at room temperature in the amount of approximately 0.5 to 1.5 equivalent of said anhydride per epoxide equivalent of said epoxide mixture; and thereafter curing said mixture at a temperature of 120° C. to 180° C. in the presence of a tertiary amine catalyst.

10. The process of producing resinous products comprising the steps of forming an epoxide mixture containing 60% to 75% by weight of an epoxidized tall oil fatty acids ester of pentaerythritol, said ester having an oxirane content of 5.2% to 7.3%, and 25% to 40% by weight of a low molecular weight polyglycidyl ether which is the product of the condensation of epichlorohydrin with 2,2-bis(4-hydroxyphenyl) propane, said ether having an epoxide equivalent weight below approximately 400; adding to said epoxide mixture 3,4-dimethyl-6-isobutenyltetrahydrophthalic anhydride said anhydride being liquid at room temperature, in the amount of approximately one equivalent of said anhydride per epoxide equivalent of said epoxide mixture; adding to said mixture 1% to 10% based on the weight of the epoxide mixture of a tertiary amine catalyst; and thereafter curing the resulting mixture at a temperature between 120° C. and 180° C.

References Cited by the Examiner
UNITED STATES PATENTS

| | | | |
|---|---|---|---|
| 2,324,483 | 7/1943 | Castan | 260—47 |
| 2,682,514 | 6/1954 | Newey | 260—18 |
| 2,682,515 | 6/1954 | Naps | 260—18 |
| 2,768,153 | 10/1956 | Shokal | 260—47 |
| 2,993,920 | 7/1961 | Budde et al. | 260—18 XR |
| 3,078,235 | 2/1963 | Bowman et al. | 260—47 |

OTHER REFERENCES

Lee: Epoxy Resins, pp. 115–117, 125 and 134–140, McGraw-Hill, New York (1957).

Ohloff: Chemische Berichte, vol. 90, No. 8, pages 1554–1559, pages 1555 and 1558 relied on, 1957.

LEON J. BERCOVITZ, *Primary Examiner.*

MILTON STERMAN, JAMES A. SEIDLECK,
*Examiners.*

T. D. KERWIN, R. W. GRIFFIN, *Assistant Examiners.*